(12) United States Patent
Ledoux et al.

(10) Patent No.: US 7,039,478 B2
(45) Date of Patent: May 2, 2006

(54) METHOD AND SYSTEM FOR AUTHORING A SOUNDSCAPE FOR A MEDIA APPLICATION

(75) Inventors: Eric Ledoux, Bellevue, WA (US); Vinayak A Bhalerao, Redmond, WA (US); Paul L Kollmorgen, Kirkland, WA (US); Robin L Goldstein, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 36 days.

(21) Appl. No.: 10/870,242

(22) Filed: Jun. 16, 2004

(65) Prior Publication Data

US 2004/0225389 A1 Nov. 11, 2004

Related U.S. Application Data

(63) Continuation of application No. 09/433,612, filed on Nov. 2, 1999, now Pat. No. 6,757,573.

(51) Int. Cl.
*G06F 17/00* (2006.01)
*H03G 3/00* (2006.01)

(52) U.S. Cl. ............... 700/94; 700/97; 381/64; 381/73.1

(58) Field of Classification Search ............... 700/94, 700/95, 97, 99, 112; 381/61, 73.1, 57, 58
See application file for complete search history.

(56) References Cited

U.S. PATENT DOCUMENTS

| 4,956,806 A | 9/1990 | Crowe et al. |
|---|---|---|
| 5,253,168 A | 10/1993 | Berg |
| 5,331,111 A | 7/1994 | O'Connell |
| 5,450,597 A | 9/1995 | Klappert et al. |
| 5,471,009 A | 11/1995 | Oba et al. |
| 5,684,259 A | 11/1997 | Horii |
| 5,715,369 A | 2/1998 | Spoltman et al. |
| 5,831,518 A | 11/1998 | Nagahara et al. |
| 6,061,696 A | 5/2000 | Lee et al. |
| 6,490,359 B1 | 12/2002 | Gibson |

*Primary Examiner*—Binh K. Tieu
(74) *Attorney, Agent, or Firm*—Christensen O'Connor Johnson Kindness PLLC

(57) ABSTRACT

A method and system are provided for allowing a sound designer to design and implement interactive soundscapes based on existing waveform audio files, MIDI files, or audio streams. This is accomplished by using a set of tools consisting of an authoring tool for creating specifications of interactive soundscapes visually without having to write complex code, and a graph builder object that recreates the authored soundscape and interacts with it in real-time according to its specification. To give non-programmers the ability to specify and test how a soundscape will interact with programmatic events and user input in an application, the following tools are also provided: an interface to construct a "control panel;" a graphical "trigger-condition-action" specification that defines what actions to take when input from the control panel or application interface is received; a preview mode that enables the sound designer to interact with the soundscape in the same way that the application will; and the ability to save the soundscape as a file that can be edited or used at run-time to recreate the soundscape. Once the interface between the soundscape and the application has been agreed to, the tools allow the sound designer to work independently of the programmer of the media application.

18 Claims, 15 Drawing Sheets

METHOD AND SYSTEM FOR AUTHORING A SOUNDSCAPE FOR A MEDIA APPLICATION

CROSS-REFERENCE TO RELATED APPLICATION

This application is a continuation of U.S. application Ser. No. 09/433,612, filed Nov. 2, 1999, now U.S. Pat. No. 6,757,573 priority from the filing date of which is hereby claimed under 35 U.S.C. § 120.

FIELD OF THE INVENTION

This invention relates generally to writing media computer applications, and more particularly to designing and implementing interactive soundscapes.

BACKGROUND OF THE INVENTION

The demand for sophisticated interactive audio designs in interactive media applications today is great, for example, in the area of computer games. However, there is a lack of skilled developers who also have strong sound design skills. To address this deficiency, many development groups use the services of sound designers and other multimedia professionals with expertise in producing and designing audio for applications.

The dichotomy of skills between developer and sound designer naturally creates a dependent relationship. Unfortunately, this relationship can be quite inefficient for a number of reasons. First, existing tools for interactive sound design are more complicated than desired for the average skilled sound designer or other non-programmer. Thus, sound designers are completely dependent on developers for all experimentation, testing, and editing of their soundscapes. Second, the lack of tools for sound designers requires developers to spend time modifying code in order to make changes that are purely aesthetic in nature. Developers generally have many responsibilities in addition to the audio portion of an application, and therefore have little time to iterate with sound designers over aesthetic changes in the audio design. These first two problems create a third problem: audio designs cannot be created and modified simultaneously while code is being written. Therefore, the interactive sound and the non-audio design aspects of the application design are a linear process, rather than a parallel process. This inefficiency often results in higher costs for audio design and/or poorly implemented audio design.

Another significant problem for interactive media developers is the lack of media management tools for either the developer or the sound designer. Therefore, there exists a need for a tool that allows a sound designer to develop and test a soundscape. This tool should enable the sound designer to work independently of the developer of a media application, thereby allowing for the parallel development of the audio and non-audio portions of a media application.

SUMMARY OF THE INVENTION

The present invention is directed to providing a set of tools for designing and implementing interactive soundscapes based on existing audio files, such as waveform audio files, MIDI files, or audio streams. These tools allow the sound designer to work independently of, and in parallel with, the developer of a media application.

In accordance with an aspect of the invention, the tools include a user interface that enables a sound designer to create, test and modify a soundscape independently of the application.

In accordance with other aspects of the present invention, the user interface includes a media graph display that enables a sound designer to associate an existing sound file with a node. The media graph gives the sound designer the capability of connecting various nodes.

In accordance with yet other aspects of the present invention, the user interface includes: a control panel display that allows the sound designer to define controls, an action editor that allows the sound designer to associate sounds based on the controls, and a preview display that allows the sound designer to test the media graph using the controls and actions specified.

In accordance with further aspects of the present invention, application programming interface (API) calls are provided that allow the developer access to the soundscape defined by the sound designer.

In accordance with still further aspects of the invention, a run-time engine is provided that accesses the soundscape as specified by the APIs used in the application.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
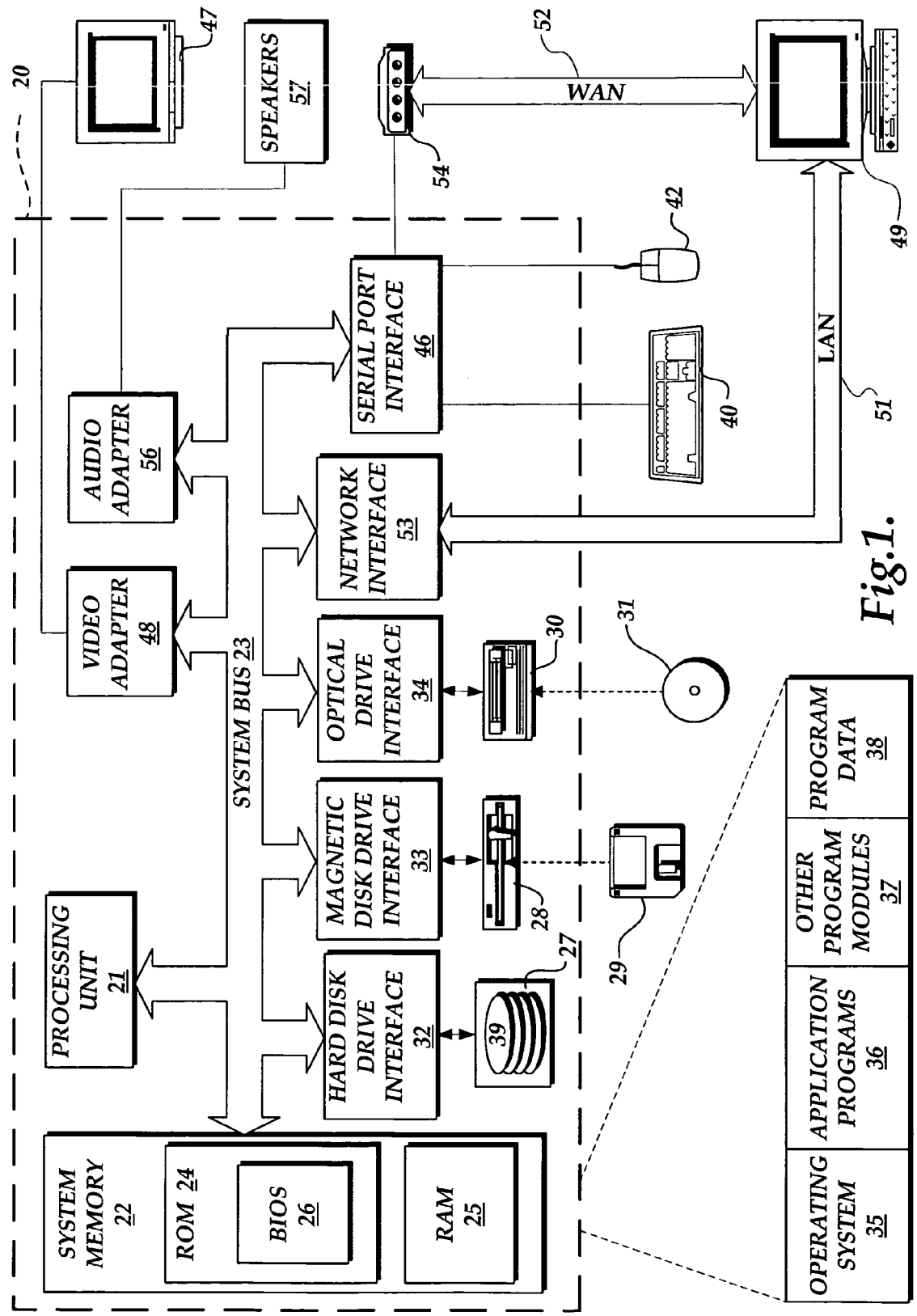
FIG. 1 is a block diagram of a general purpose computer system suitable for implementing the present invention.

FIG. 1 and the following discussion are intended to provide a brief, general description of a suitable computing environment in which the present invention may be implemented. Although not required, the invention will be described in the general context of computer-executable instructions, such as program modules, being executed by a personal computer. Generally, program modules include routines, programs, characters, components, data structures, etc., that perform particular tasks or implement particular abstract data types. As those skilled in the art will appreciate, the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 39, a magnetic disk drive 28 for reading from or writing to a removable magnetic disk 29, and an optical disk drive 30 for reading from or writing to a removable optical disk 31, such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer-readable instructions, data structures, program modules, and other data for the personal computer 20. Although the exemplary environment described herein employs a hard disk 39, a removable magnetic disk 29, and a removable optical disk 31, it should be appreciated by those skilled in the art that other types of computer-readable media that can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk 39, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus 23, but may also be connected by other interfaces, such as a parallel port, game port or a universal serial bus (USB). A display in the form of a monitor 47 is also connected to the system bus 23 via an interface, such as a video card or adapter 48. One or more speakers 57 may also be connected to the system bus 23 via an interface, such as an audio adapter 56. In addition to the display and speakers, personal computers typically include other peripheral output devices (not shown), such as printers.

The personal computer 20 may operate in a networked environment using logical connections to one or more personal computers, such as a remote computer 49. The remote computer 49 may be another personal computer, a server, a router, a network PC, a peer device or other common network node, and typically includes many or all of the elements described above relative to the personal computer 20. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20 or portions thereof may be stored in the remote memory storage device. It will be appreciated that the network connections shown are exemplary, and other means of establishing a communications link between the computers may be used.

The present invention consists of two primary components: a Media Author which is an authoring tool for creating specifications of interactive soundscapes visually without having to write complex code and a media graph run-time graph builder object that recreates the authored soundscape and interacts with it in real-time according to its specification. Sound designers use the Media Author to create media graphs (or soundscapes), that can be graphically represented to display sound sources, filters that manipulate each source, and output mechanisms for playing back the sources. Media graphs created with Media Author are made up of nodes, which are small Active X controls that can provide an audio source, provide a means of audio processing, or play audio data. Nodes have input and output pins to which connections are made by a user in order to establish a series of audio processors for any given audio source. Media Author is also used to specify behaviors of the soundscape in response to programmatic events and input from the host application or Web page. These can be tested in real-time by the sound designer using a preview mode that emulates the real-time responses of the soundscape.

Figure 2:
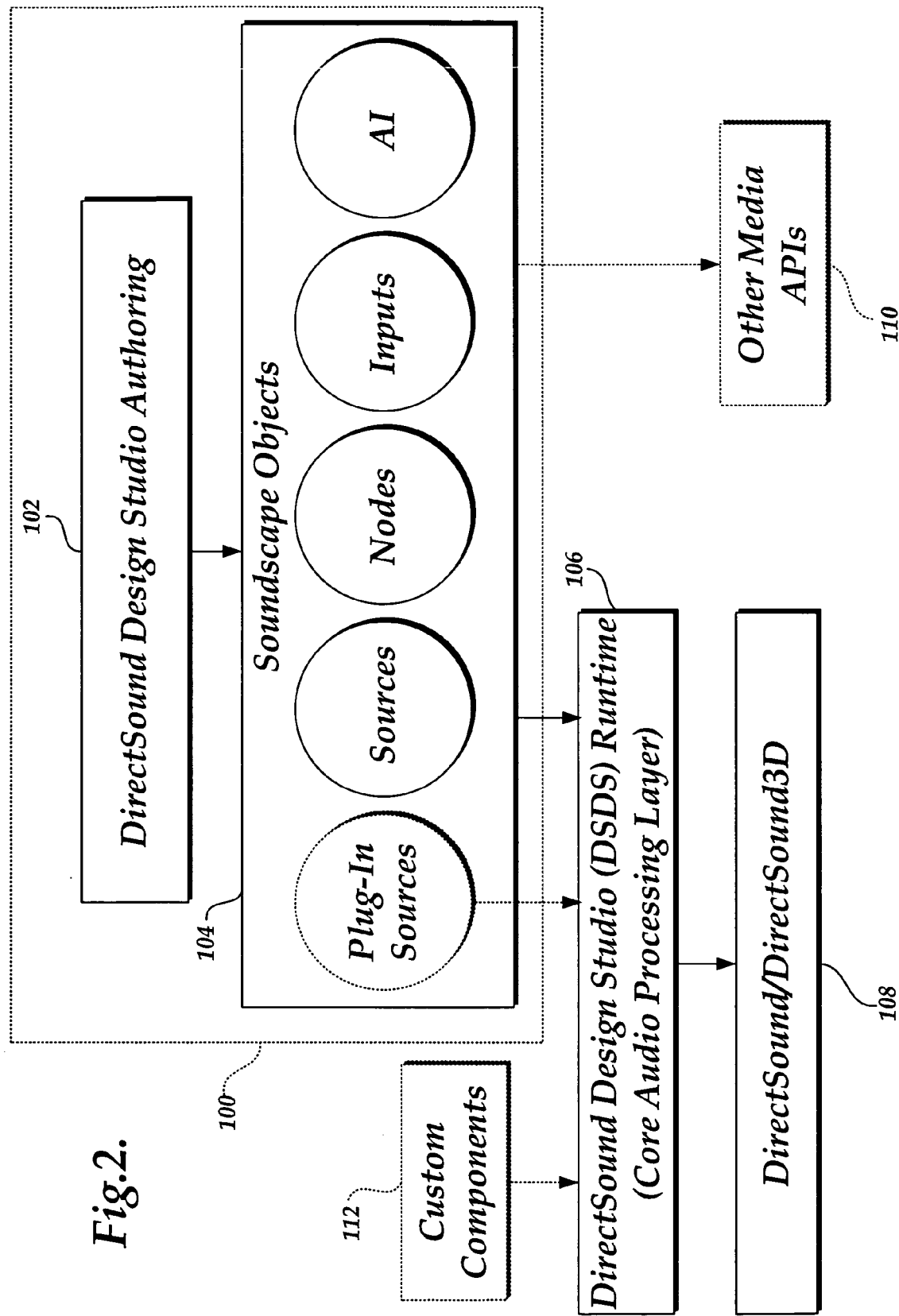
FIG. 2 is an architecture diagram of a preferred embodiment of the present invention.

While the present invention was developed to run on a computer with a Microsoft Windows 95, Microsoft Windows 98 or Microsoft Windows NT operating system, it will be appreciated that the invention can be implemented in environments using other operating systems. FIG. 2 is an architecture diagram ideally suited for implementation of the present invention in either a Windows 95, Windows 98 or Windows NT environment running in a computing environment as shown in FIG. 1.

A set of tools 100 formed in accordance with the invention for designing and implementing interactive soundscapes includes an authoring tool 102 and soundscape objects 104, both of which are described later. The soundscape objects 104 include the objects necessary to build a run-time graph, as described later.

The core audio processing layer 106 shown in FIG. 2 provides the interface between a DirectSound/DirectSound 3D component 108, the SoundScape objects 104 and custom components 112.

The DirectSound/DirectSound 3D component 108 is preferably a Direct X element that uses hardware to its greatest advantage whenever possible, and emulates hardware features in software if the feature is not present in the hardware. This component is standard in the Windows 95, Windows 98 and Windows NT operating environments.

The other media Application Programming Interfaces (APIs) 110 are optional media APIs other than DirectSound 108, such as DirectMusic which is used for interactive music and sampled Musical Instrument Digital Interface (MIDI) instrument playback and DirectShow which is used for streaming audio and video playback, that can be used in conjunction with the interactive soundscape tools 100.

The custom components 112 are optional components built by customers to work on top of the Direct Sound Design Studio (DSDS) API 106 using a set of core audio processing functions. Such components are independent of the authoring tool 102. For example, a plug-in for a non-Active X platform, such as Netscape or Director, could form a custom component.

Figure 3:
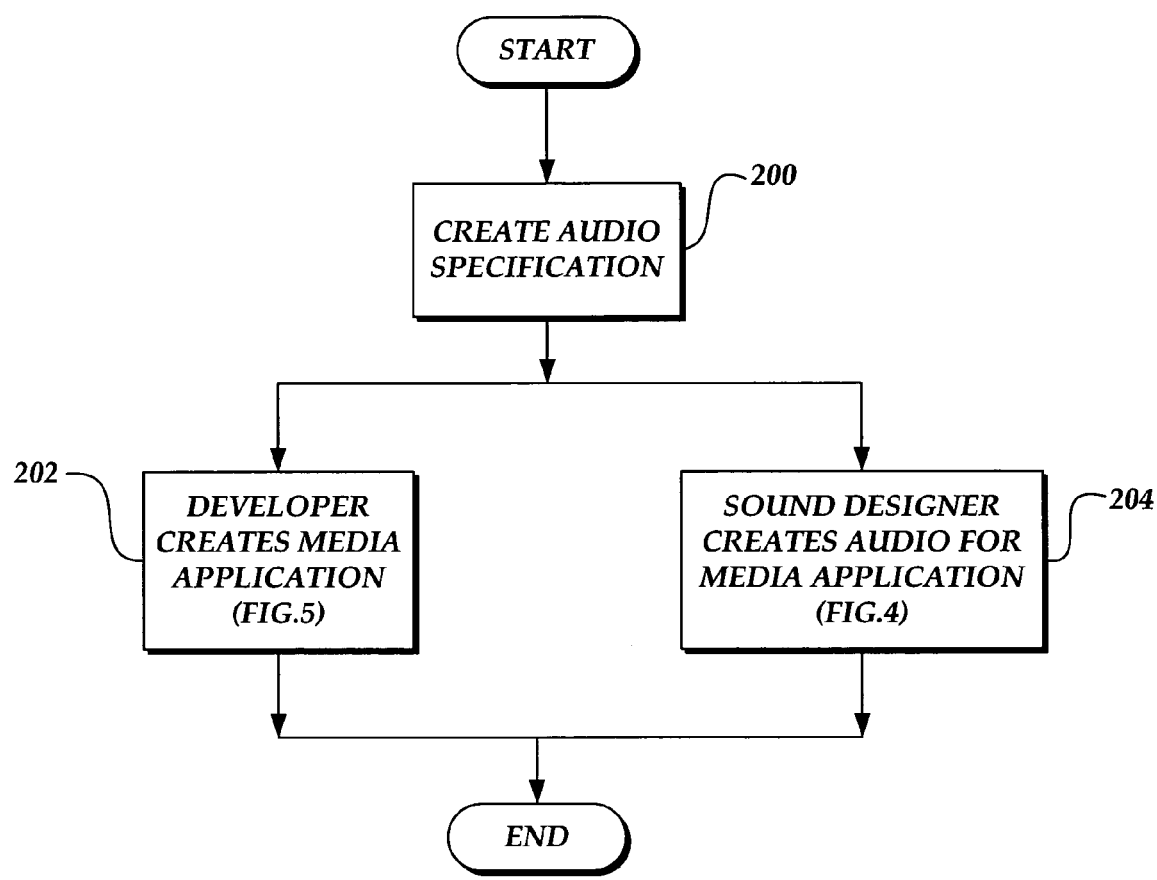
FIG. 3 is an overall flow diagram illustrating the logic of creating a media application.

FIG. 3 is a flow diagram illustrating the overall logic of creating a media application in accordance with the present invention. The logic moves from a start block to block 200 where an audio specification is created. The creation of an audio specification can be a manual process or an automated process. The creation of an audio specification is required so that the sound designer and the developer can work in parallel. Once the audio specification has been created, the logic moves to block 202 where a developer creates video for a media application as illustrated in detail in FIG. 5. At the same time that the developer is creating video for the media application 202, a sound designer can create and test an audio soundscape for the media application using the interactive soundscape tools, as illustrated in detail in FIG. 4 and described below. See block 204. After the developer has created the media application 202 and the sound designer has created the audio for the media application 204, the media application is complete, and the logic of creating a media application ends.

It will be appreciated that the development of the media application 202 and the creation of the sound design 204 are iterative processes and will complete at different times. The key is that the present invention takes what used to be a linear process and makes it a parallel process. The present invention is directed to a set of tools that allow a sound designer to create and test the audio aspects of a media application independently of the development of the non-audio aspects of the media application. This is accomplished with a user interface, such as the one shown in FIGS. 7–10 and described below.

Figure 4:
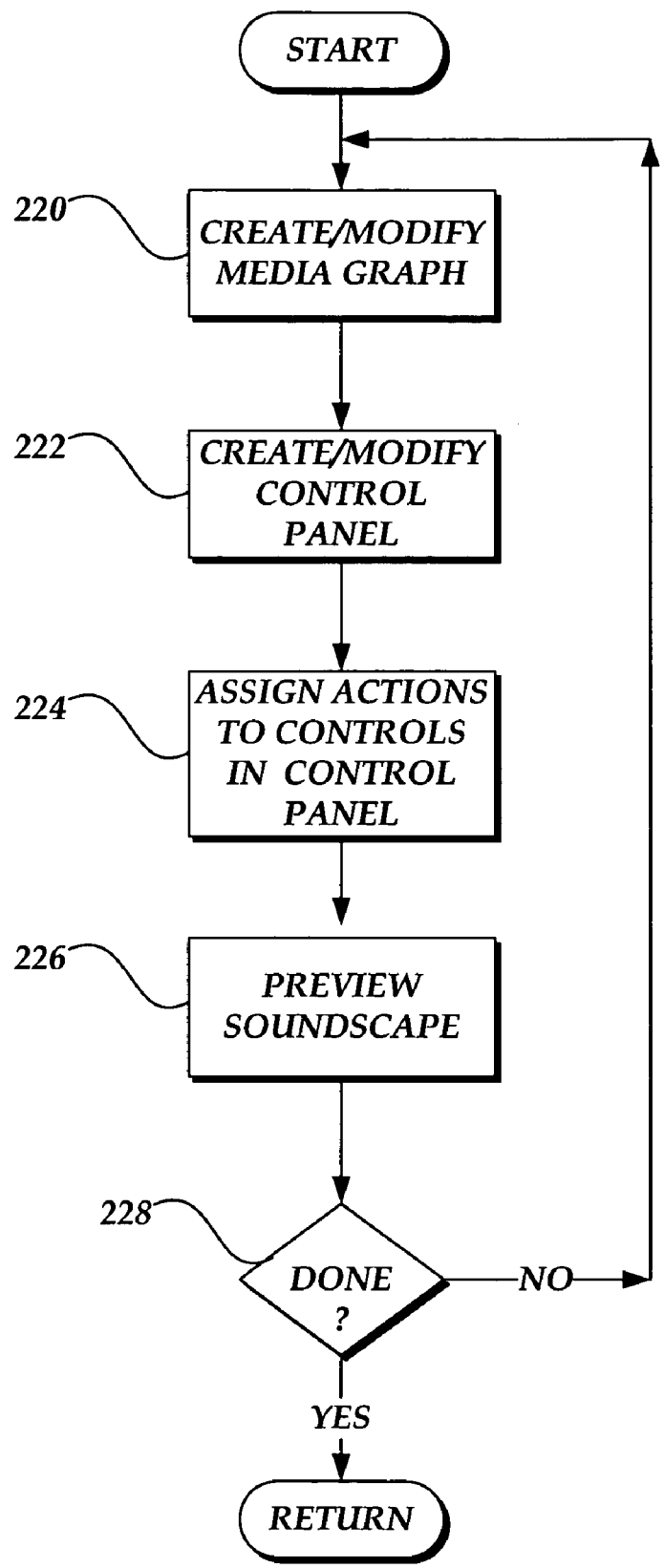
FIG. 4 is a flow diagram illustrating in detail the logic used by a sound designer for creating audio for the media application.
Figure 7:
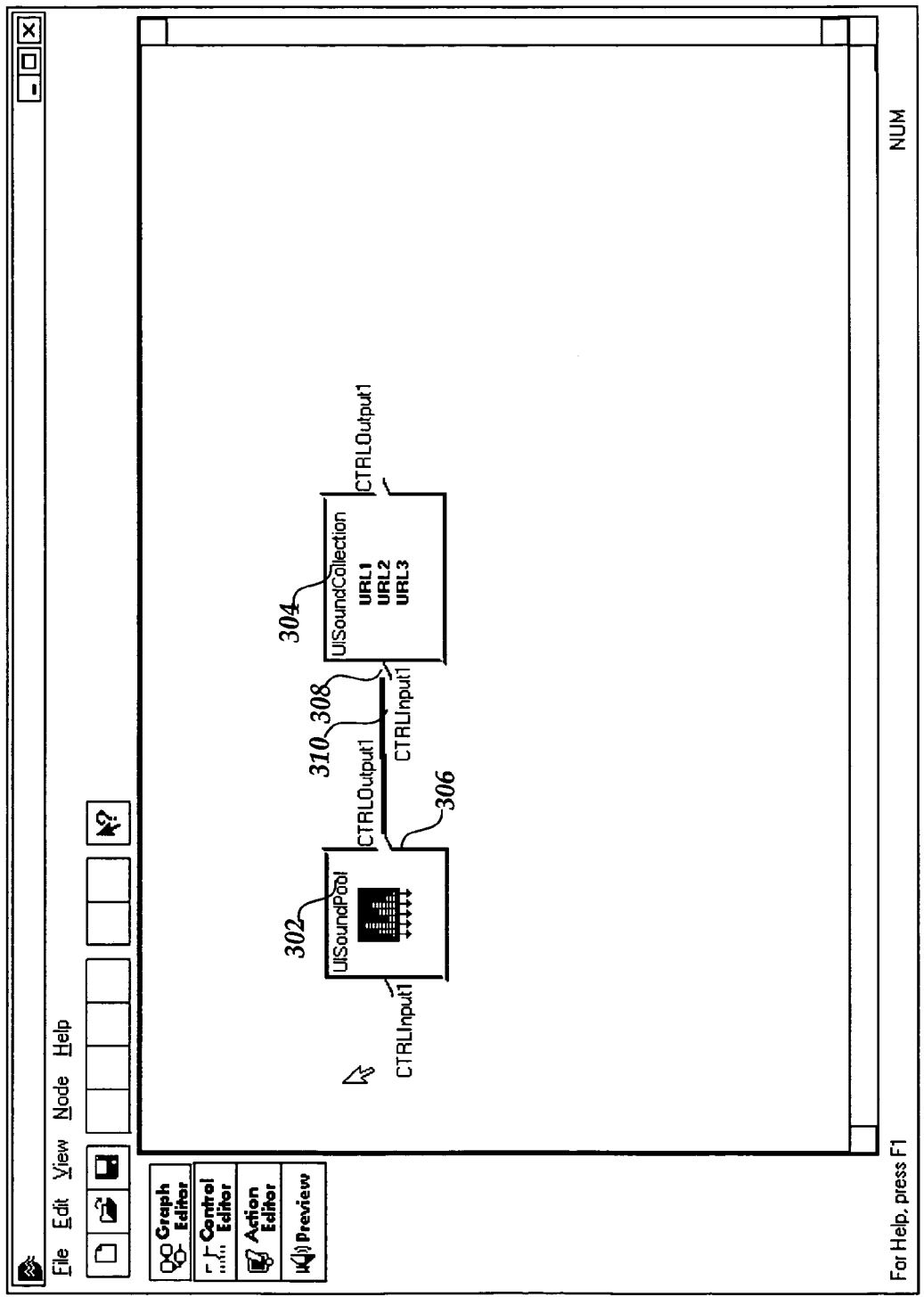
FIG. 7 is an example of a user interface of a media graph editor for a simple soundscape design.
Figure 8:
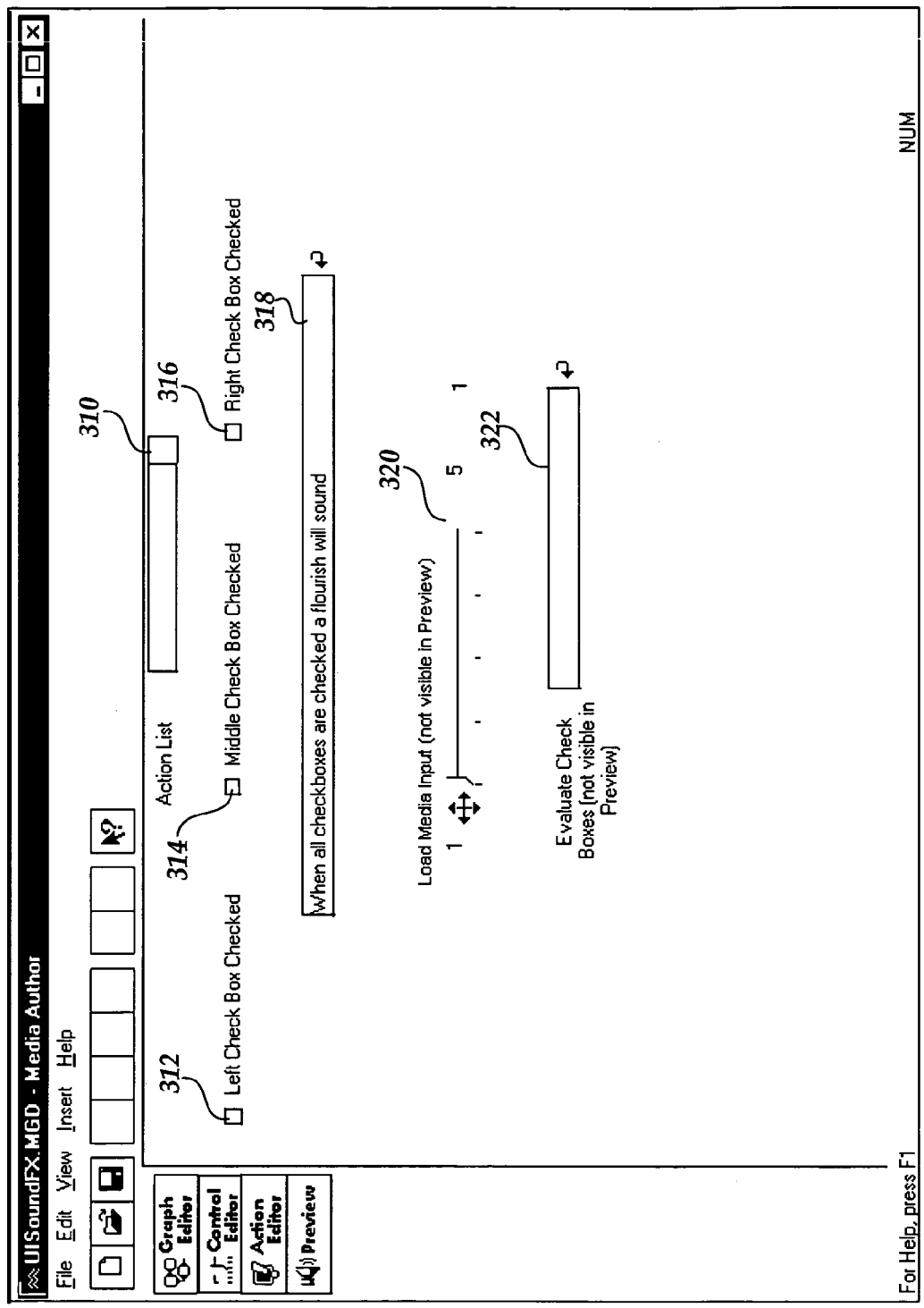
FIG. 8 is an exemplary user interface of a control editor for use with the media graph shown in FIG. 7.

FIG. 4 illustrates the logic for creating an audio soundscape for a media application. The logic moves from a start block to block 220 where a media graph is created and modified. A media graph is a visual tool used by a sound designer to create a soundscape. As described later, the sound designer uses media (i.e., audio) files as sound source nodes, and creates desired effects by connecting nodes with pins. Creation of a media graph is shown in FIG. 7 and is described later. Next, in block 222, a control panel is created and modified using a control editor. By using the controls defined using the control editor, the sound designer can simulate the behavior of the media graph in the target application. Creation of a control panel is shown in FIG. 8 and is discussed later. The logic then moves to block 224 where actions are assigned to controls in the control panel. This can be accomplished using an action editor, such as the one shown in FIG. 9 and described later. The action editor lets the sound designer assign actions to the controls created in the control panel in order to control the nodes of the media graph. Next, in block 226, the actions are displayed so that they can be previewed (i.e., tested) using the controls defined using the control editors. FIG. 10, described later, is an example of a preview display.

Next, the logic moves to decision block 228 where a test is made to determine if processing is complete. If so, the logic ends and processing returns to FIG. 3. If not, the logic returns to block 220, and the logic of blocks 220–226 is repeated until it is determined in decision block 228 that processing is done.

It will be appreciated that the order of blocks 220–226 may vary depending on the user's selection. In other words, preferably, user interfaces include a graph editor such as the one shown in FIG. 7, a control editor such as the one in FIG. 8, an action editor such as the one in FIG. 9, and a preview display such as the one in FIG. 10, and the user can move between the various user interfaces as desired. There are a few restrictions, such as media graphs must first be in place before controls can be assigned to nodes. The node and controls must be in place before an action can be assigned.

Figure 5:
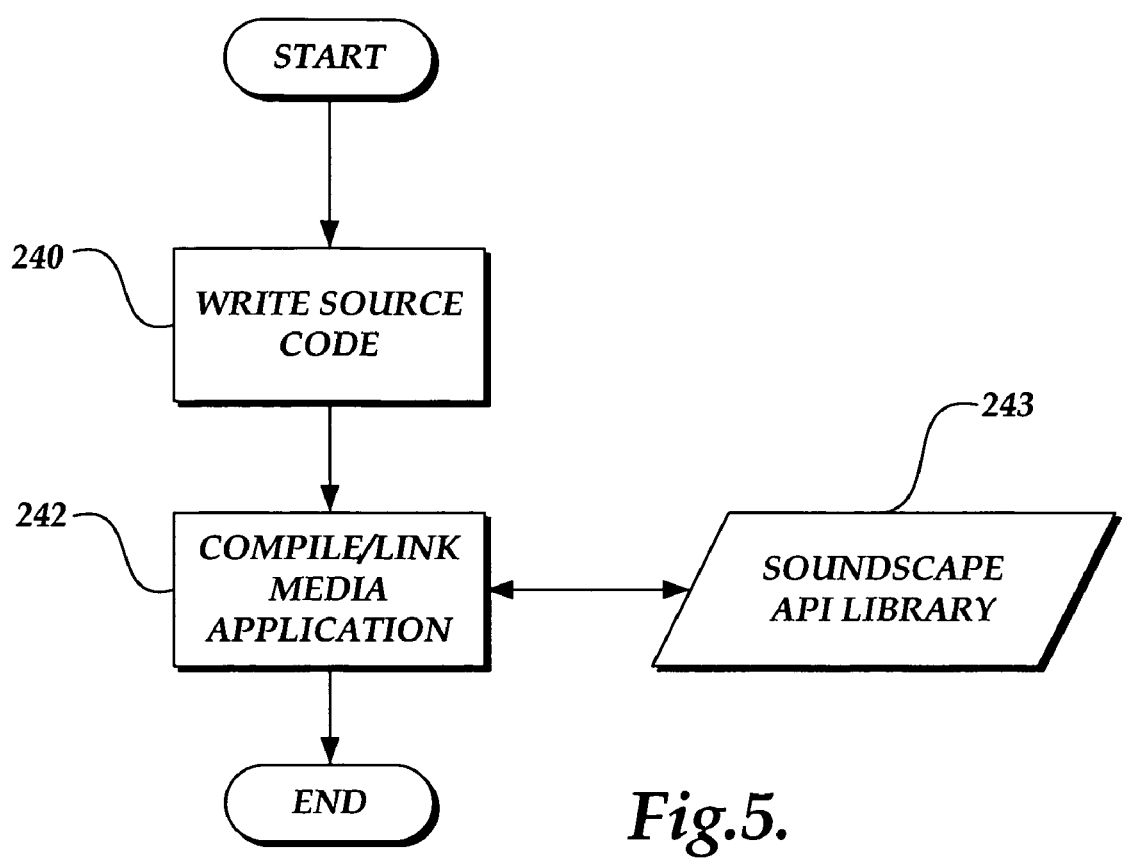
FIG. 5 is a flow diagram illustrating the logic used by a developer for creating the media application.

FIG. 5 illustrates the logic used by a developer to create a media application. The logic moves from a start block to block 240 where the developer writes source code. It will be appreciated that the source code can be written in a variety of programming languages, and that various tools may be used by the developer in order to write the source code. Writing source code is known in the art, and is not detailed further herein. The developer includes API calls for the audio aspects of the media application. The developer uses the specification (created in block 200) as a guide for when to include what audio functions. For example, if the media application is a football game, the sound of a roaring crowd may be played when the home team scores a touchdown. The developer can include access to the file that plays the sound even though the sound is being created by a sound designer at the same time that the media application is being written by the programmer.

Below is a simple example using high-level APIs:

MFStreamFromFileCreate(&pStream, "Filename.htm", 0);

MGMediaGraphFromStreamCreate(&pMediaGraph, g_hwnd, 0, NULL, pStream);

pMediaGraph->SetInputValue(L"LoadMySound", VT_I4, 1);

. . .

pMediaGraph->SetInputValue(L"PlayMySound", VT_I4, 1);

. . .

pMediaGraph->Release( )
pStream->Release( );

In the example illustrated above, the first few lines load the media graph, "Filename.htm," provided by the sound designer. The calls to "SetInputValue" may cause one or more triggers in the media graph to "fire" (e.g., the "Play-MySound" SetInputValue may start playing a sound). The calls to "Release" free the resources used by the program.

Below is an example for playing a sound from disk using low-level APIs:

```
ISECreate (NULL, &pise);
pise→RegisterSoundFileOrURL ("music.wav", REGISTER_LOADNONE,
REGISTER_FILETYPESIMPLE, NULL, NULL, NULL, NULL, &psound);
    pise→CreateChannel (CHANNEL_CONTROLVOLUME, NULL, &pchannel);
    pise→LoadSoundIntoChannel (pchannel, psound, CHANNEL_LOADOPEN,
CHANNEL_OPTIMIZEMEMORY, NULL, NULL);
    pise→PlaySound (pchannel, psound, 1.0, 0.0, 1.0);
    Below is another example using low-level APIs. This example plays three
gunshots using DirectSound buffers:
    ISECreate (NULL, &pise);
    pise→RegisterSoundFileOrURL ("gunshot.wav", REGISTER_LOADNONE,
REGISTER_FILETYPESIMPLE, NULL, NULL, NULL, NULL, &psound);
    pise→CreateChannel     (CHANNEL_FIREANDFORGET     |
CHANNEL_CONTROLVOLUME | CHANNEL_CONTROLPAN, NULL, &pchannel);
    pise→LoadSoundIntoChannel (pchannel, psound, CHANNEL_LOADALLFILE,
CHANNEL_OPTIMIZEPLAYLATENCY, NULL, NULL);
    pise→PlaySound (pchannel, psound, 0.8, 0.2);
    pise→PlaySound (pchannel, psound, 0.8, 0.2);
    pise→PlaySound (pchannel, psound, 0.8, 0.2);
```

The source code is compiled and linked to create the media application in block 242. A soundscape API library is linked in the media application. Once the desired application is created, the logic of FIG. 5 ends and processing returns to FIG. 3.

Figure 6:
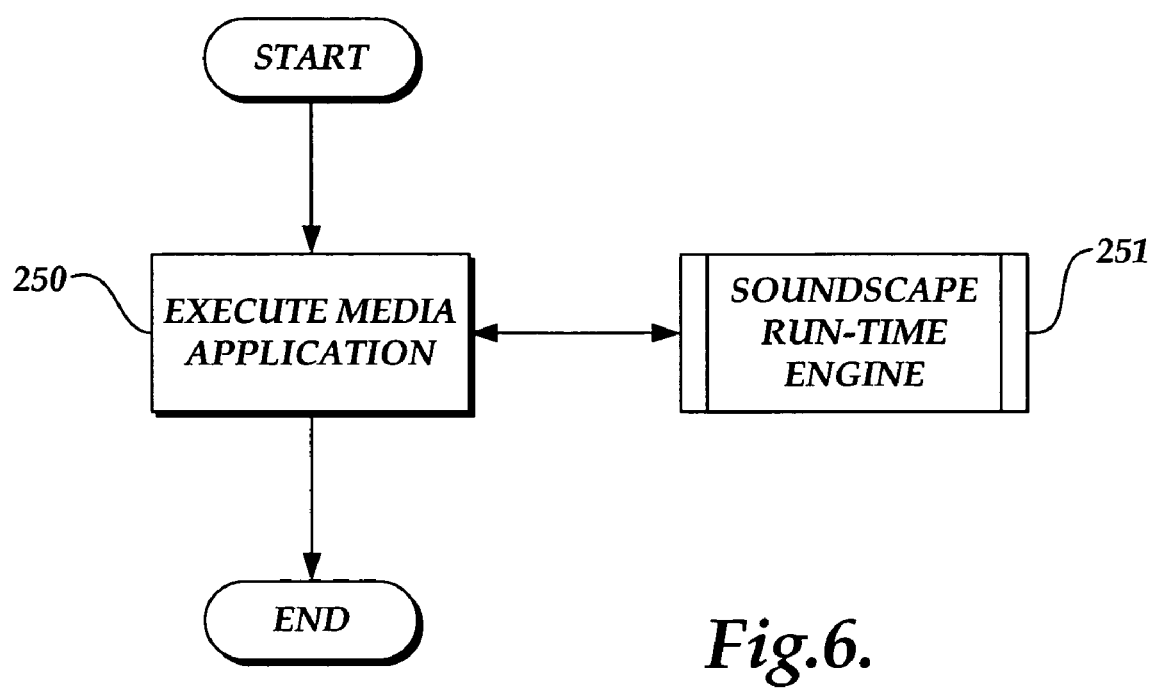
FIG. 6 is a flow diagram illustrating the logic of executing the media application created in FIG. 5.

FIG. 6 illustrates the logic of executing the media application created in FIG. 5. The application is executed in block 250. Execution of a computer program is known in the art and will not be described further. The executed program uses the SoundScape run-time engine to play the audio soundscape. As described above, the developer includes API calls in the application to play sounds in the audio soundscape based on the specificatios that were defined by the developer and/or the sound designer.

FIGS. 7–10 illustrate exemplary user interface displays for an embodiment of this invention. The user interface shown in FIGS. 7–10 shows the authoring tool provided for an audio designer to create the soundscape for a media application (block 204 of FIG. 3). The example illustrated in FIGS. 7–10 is a simplistic example. This example is provided to illustrate and describe the basic components of the authoring tool. A more practical example is illustrated in FIGS. 12–15.

FIG. 7 illustrates an exemplary user interface for a graph editor. The graph editor allows the sound designer to build a new media graph, and modify existing media graphs. In order to build a new media graph, a user inserts nodes, edits the node properties, and connects the nodes using pins and connections.

A node is an Active X control that acts as a media object, that is, an object that is a sound source (produces media data), a sound sink (consumes media data or routes data to an output), a sound filter (transforms media data), a controller (controls behavior of other nodes, for example, stores external data, such as timing information), or some combination thereof (for example, a CrossFade is both a sink because it plays sound from a speaker and a filter because it fades the sound in/out while playing it out of the speaker). Nodes send and receive data through pins, or input/output ports, that can be joined with connections to create a data flow graph.

Examples of source nodes include MIDI, Phrase Construction, Record, StreamWav, and URLWave. A MIDI source node provides a sound source for musical data in MIDI format. A Phrase Construction source node allows for the building of a phrase out of individual wave audio files. A wave audio file is used as the source URL that contains cue points (or placeholders) that indicate where to insert the other sounds. The Phrase Construction source node is connected to one or more URLWave or URL collection nodes that provide the individual source wave audio files. The Phrase Construction source node uses the wave audio file referenced by the URL containing cue points to merge the individual wave audio files into a single phrase. A Record source node provides a way for a recording sound in Media Author using devices such as a microphone. The record source node can be used in preview mode, but the recorded sound does not become part of the soundscape of the media application. A stream StreamWav node provides a way to read wave data from an attached IStream object. IStream is an interface that supports reading and writing data to stream objects. The StreamWav node is similar to a URLWave node, except it takes an IStream as the source instead of a URL. A URLWave node provides a sound source from a wave audio file, or a set of wave audio files. It will be appreciated that the source nodes described above are exemplary, and that other source nodes can be used.

A sink node accepts the wave input but does not have any output pins, so data cannot be routed to another node. Sink nodes are the nodes that a sound designer would use to send wave output to a sound device for playback. A sink node constitutes the end of a flow graph and cannot have wave-out pins. Examples of sink nodes include: Channel, ChannelPool, CrossFade, StaticChannelPool, and WavWrite. A Channel node plays audio data that is sent to it. In other words, it allows audio data to be streamed to a local sound device. A ChannelPool node allows for the playing of different sounds simultaneously. A ChannelPool node should be used in situations where sounds need to be played one after another; for example, for the sound of gunshots being fired in rapid succession. A CrossFade node allows for cross-fading different source files between channels. This is done by allocating a new channel, connecting the input pin to the new channel, and increasing the volume of the new channel while decreasing the volume of the existing channel. CrossFade nodes can also be used to fade in or fade out a single sound. A StaticChannelPool node allows for the playing of different sounds simultaneously, and differs from the ChannelPool node in that it loads wave audio data ahead of time, i.e., before playing the sound, into a static buffer. A WavWrite node copies sound data from its input to an IStream in wave audio format. It will be appreciated that the sink nodes described above are exemplary, and that other sink nodes can be used.

Examples of filter nodes include: Append, Clip, Envelope, Loop, Mix, Resample, Speed, and Splitter. An Append node allows for the stringing of multiple sound sources one after the other. A Clip node allows for the use of a part of a sound source by clipping the sound file either at the beginning or the end. An Envelope node allows for the creation of a "fade in" and "fade out" effect which is accomplished by increasing and decreasing the volume to and from silence as the sound sources plays. A Loop node allows for the repeated playing of a sound source. A Mix node allows for the combination of multiple sound sources into a single output. The Mix node differs from the Append node in that the Append node plays source files sequentially, whereas the Mix node plays source files simultaneously. A Resample node allows for the modification of the number of channels and the sample rate that a sound source uses. For example, if the original sound source is stereo, the data rate can immediately be reduced by half by using the Resample node to change the sound to a mono sound. Data rate is affected by sample rate. In the stereo vs. mono example above, the data rate is reduced by half because the number of channels, or streams, is reduced by half, i.e., mono only uses one channel, whereas stereo uses two discrete channels. A Speed node allows for the changing of the frequency (pitch) of a sound source. A Splitter node allows for the separation of a single sound source into multiple outputs. This allows for the use of the same source file in two or more channel nodes. It will be appreciated that the filter nodes described above are exemplary, and that other filter nodes can be used.

An example of a control node is a URLCollection Node. A URLCollection node provides a way to specify a set of URLs as the source files. The source files can be played randomly or in a specific order and do not have to be located in the same directory. It will be appreciated that the control node described above is exemplary, and that other control nodes can be used.

The example media graph shown in the graph editor user interface of FIG. 7 is a simple media graph that includes two nodes: a StaticChannelPool node 302, and a URLCollection node 304. The URLCollection node 304 is connected to the StaticChannelPool node 302 by attaching a connector 310 between an input node pin 306 and an output node pin 308. Each node has properties associated with it. For example, some of the properties associated with a StaticChannelPool node include a title, and attributes, such as: allowing volume control, allowing pan control, loading media asynchronously, and a maximum channels value. Properties for a URLCollection node include: whether or not the selection of URLs is random, and a list of URLs associated with the URL collection node 304.

FIG. 8 illustrates an exemplary user interface for a control editor. A sound designer uses the control editor to build a control panel for the media graph built using the graph editor shown in FIG. 7. By using controls, the behavior of the graph in the target application can be simulated using the preview display shown in FIG. 10. For example, a track bar control can be created in the control editor, and be used to adjust the volume of a channel node. Preferably, the control editor includes controls such as a track bar, a command button, a text box, a combo box, and a check box. The control editor shown in FIG. 8 is used in conjunction with the media graph of FIG. 7, and contains an action list control 310, three check box controls 312, 314 and 316, and a text box 318 which will be displayed in preview mode. The control editor shown in FIG. 8 also includes a trackbar 320 and an edit box 322 that will not be displayed in preview mode. The controls that are designated to appear in preview mode will be displayed in the preview screen shown in FIG. 10.

Figure 9:
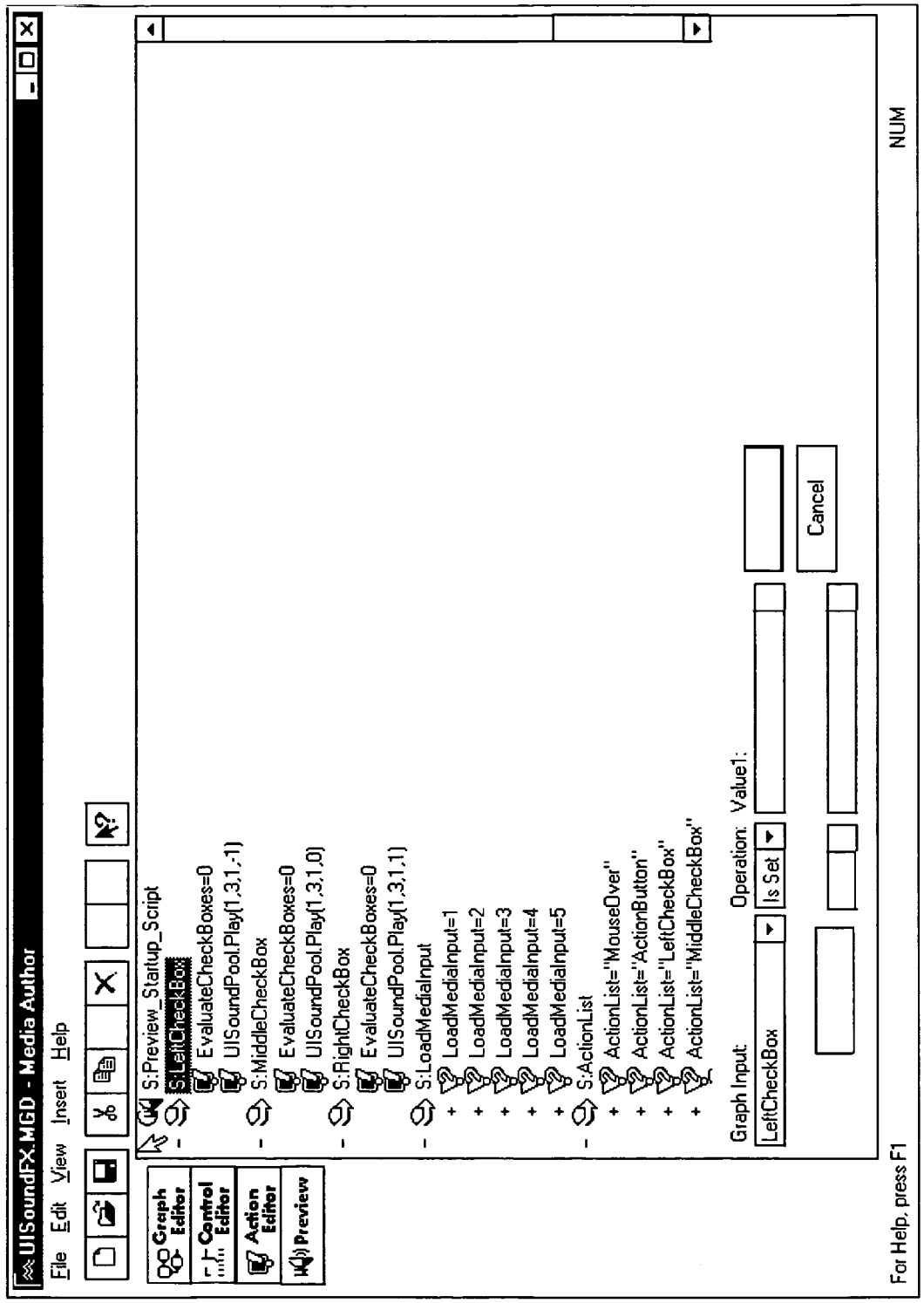
FIG. 9 is an exemplary user interface of an action editor for use with the media graph shown in FIG. 7 and the controls shown in FIG. 8.
Figure 10:
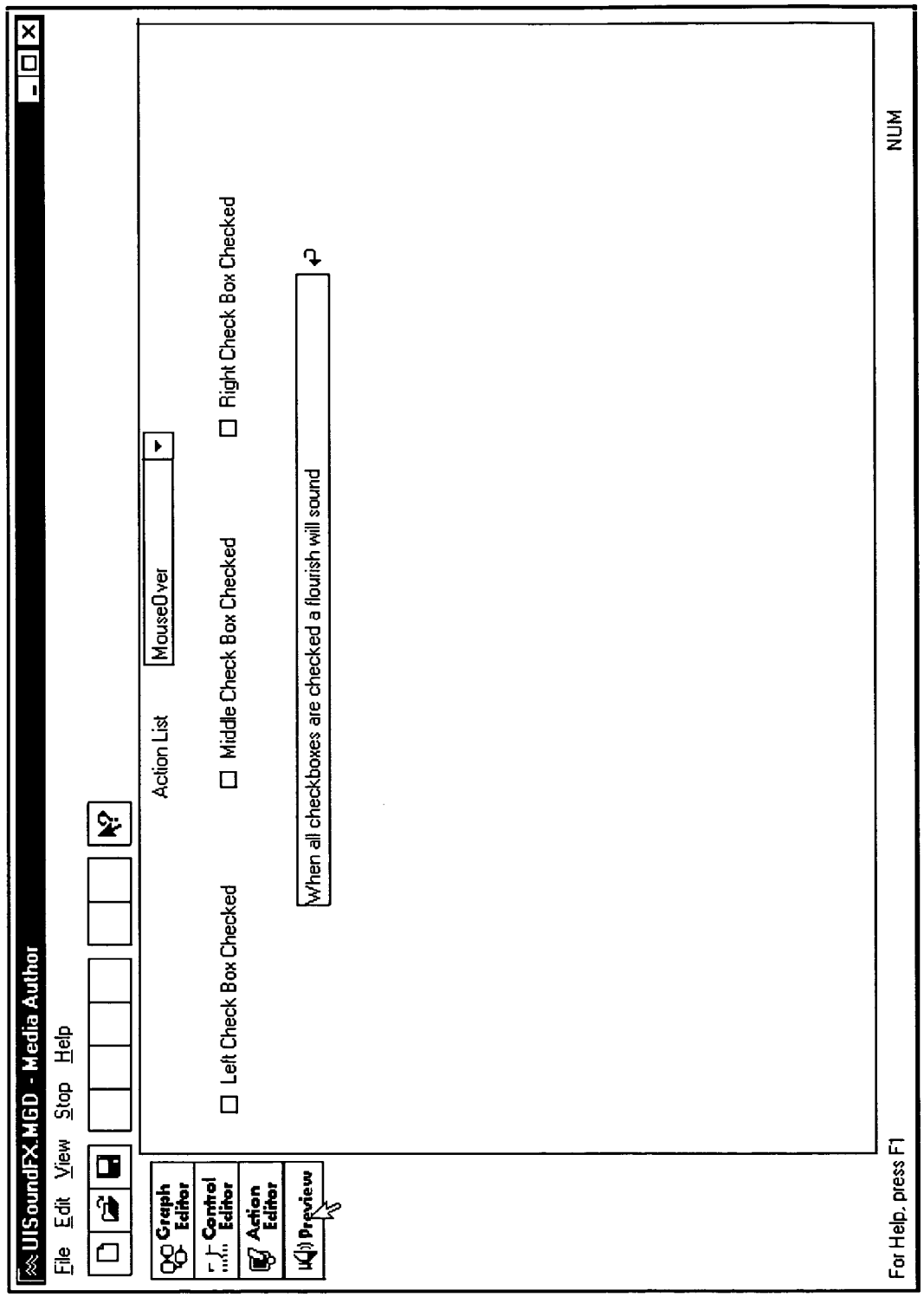
FIG. 10 is an exemplary user interface of a preview display of the soundscape using the media graph shown in FIG. 7, the controls shown in FIG. 8, and the actions shown in FIG. 9.

Actions are assigned to the controls created in the control editor of FIG. 8 using the action editor shown in FIG. 9. Actions can be performed in response to a trigger, such as clicking a button. Actions can be performed based on whether or not a certain condition is true. For example, a specific wave audio file can be played when a command button is clicked or when an event from a node is received. Events are set up by creating triggers, conditions, and actions.

A trigger sets the ball in motion. Once a trigger occurs, conditions defined in the action editor are tested. The actions are executed if the conditions are met. There are two ways to set off a trigger: interacting with one of the controls, or receiving an event from a node.

A condition is an expression that is tested to see if it is true or false. If the condition is true, the actions are executed. There are three types of conditions: checking the value of a control, checking the parameter value of an event, or checking the value of a node property.

An action occurs when the condition is true and when the trigger happens. There are three types of actions: setting a control to a specific value, calling a method on a node, or setting a node property.

FIG. 10 illustrates an exemplary preview user interface for previewing the audio specified in FIG. 7 based on the actions of FIG. 9 using the controls defined in FIG. 8. The preview display allows for the testing of the controls and actions to see how they work to control the sound.

Figure 11:
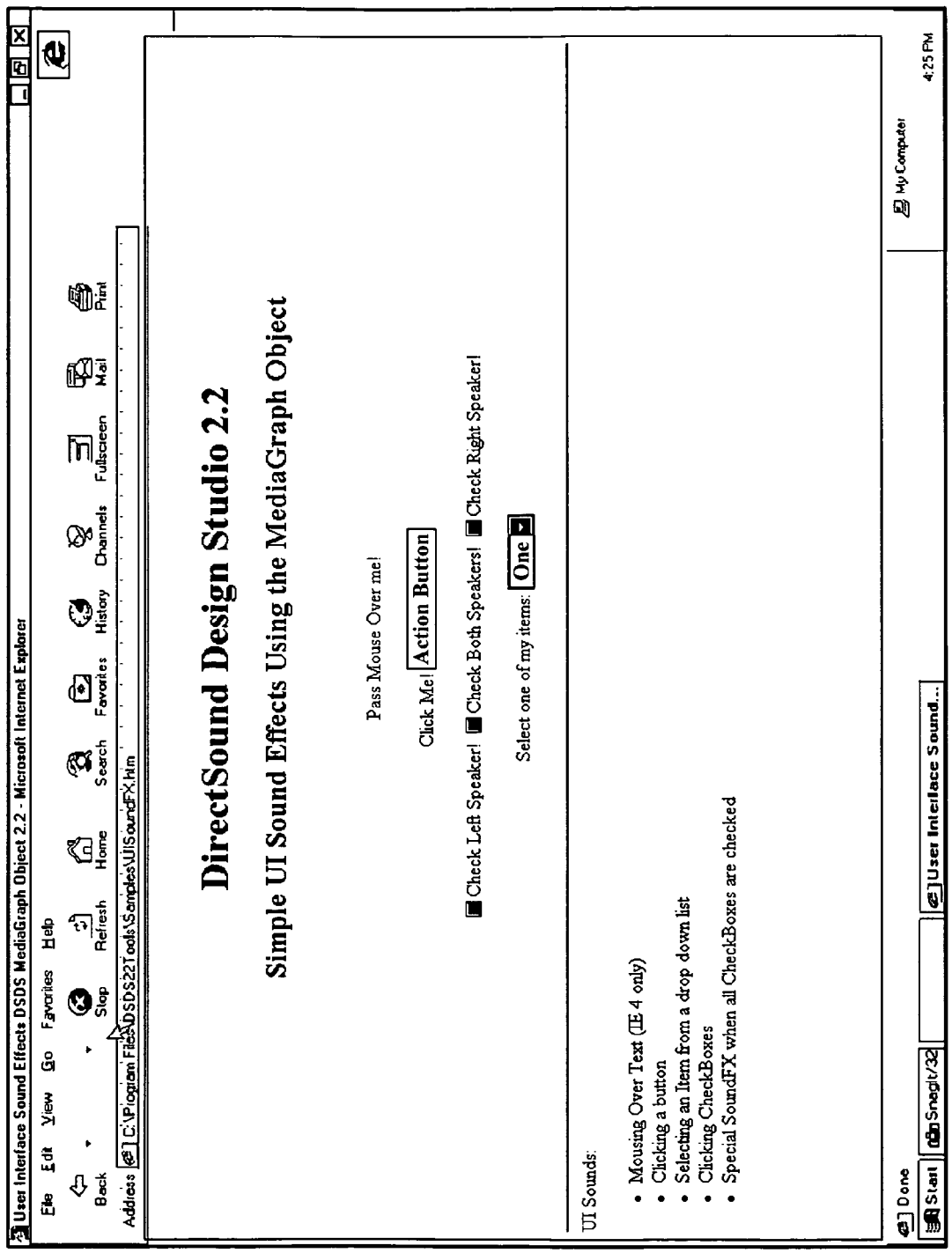
FIG. 11 is a browser display of the soundscape created with the user interface of FIGS. 7–10.

Preferably, the user can also save the soundscape as a HyperText Markup Language (HTML) file. The sound designer can then test the soundscape using a Web browser. FIG. 11 is a browser screen display of the preview display shown in FIG. 10. Appendix A is the HTML file used to render the display shown in FIG. 11.

Figure 12:
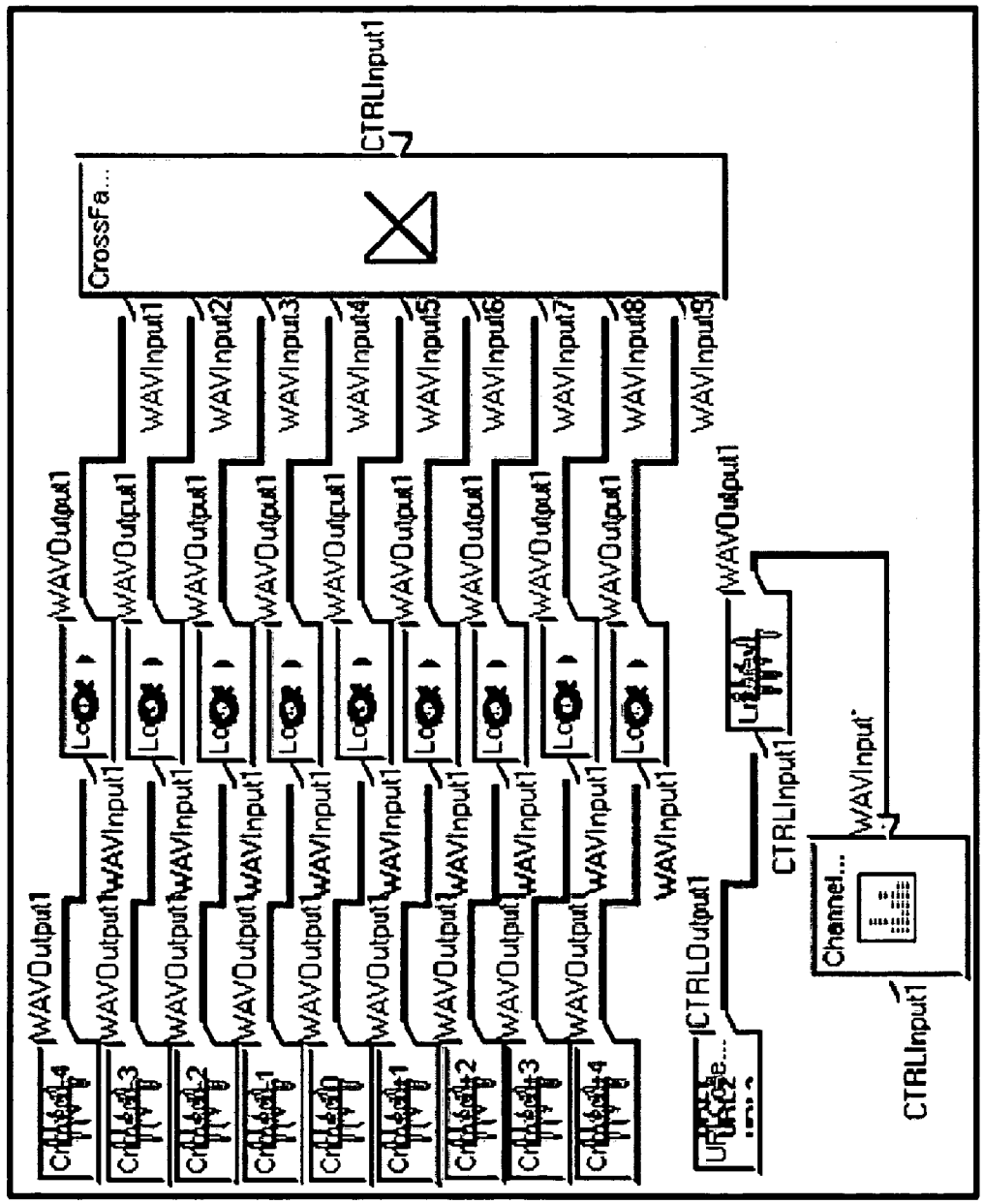
FIG. 12 is an example of a user interface of a media graph editor for a football game soundscape design.
Figure 13:
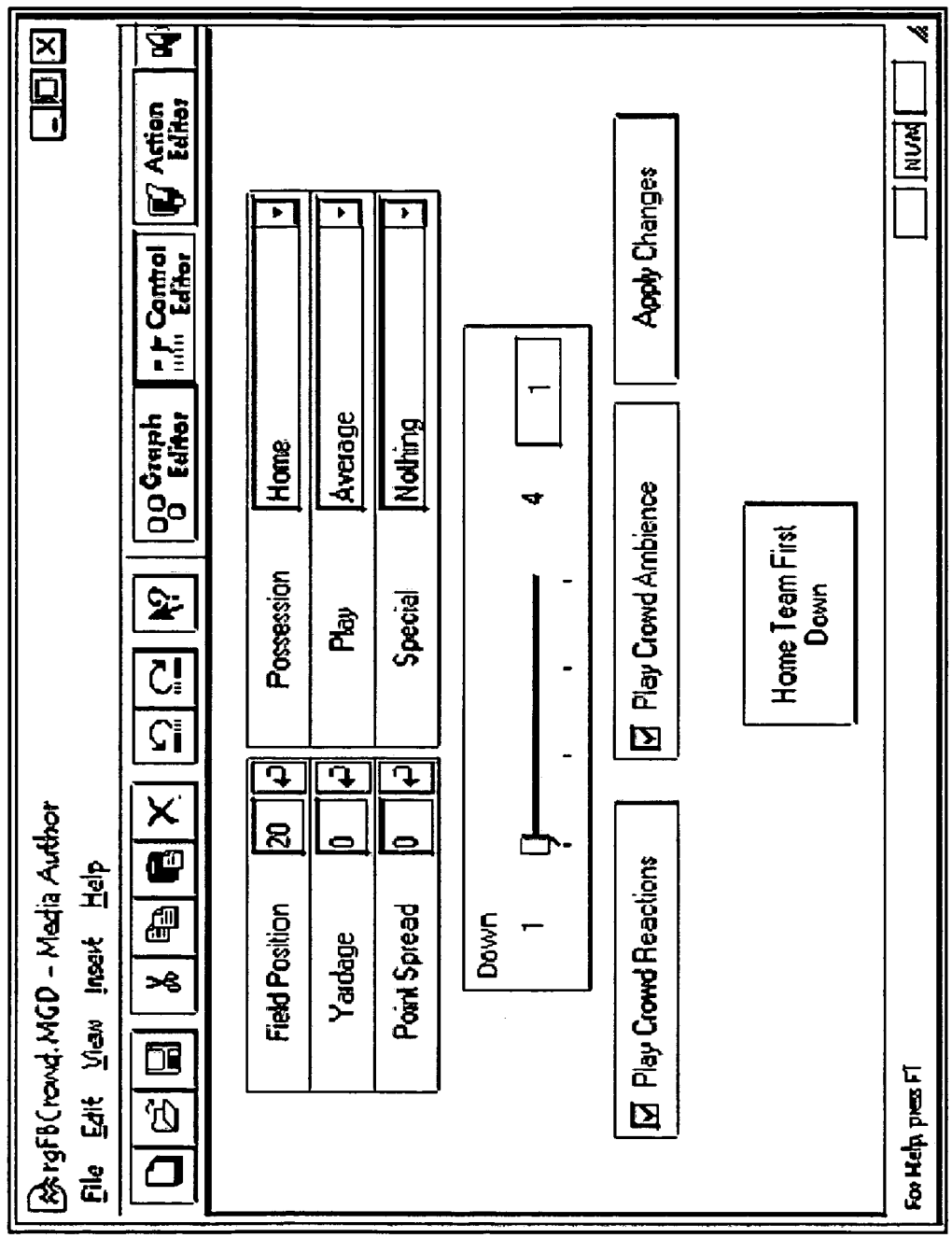
FIG. 13 is an example of a user interface of a control editor for use with the media graph shown in FIG. 12.
Figure 14:
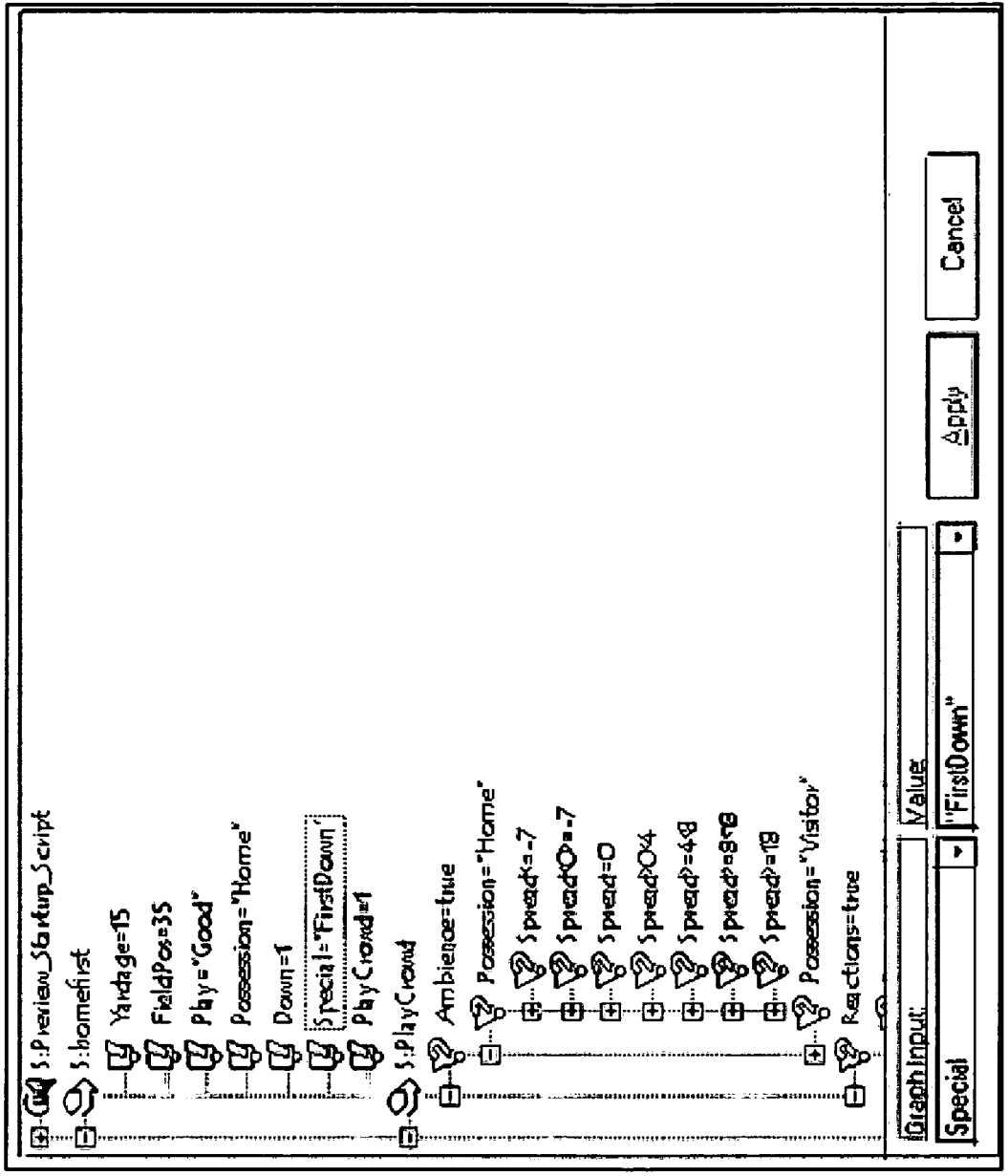
FIG. 14 is an example user interface of an action editor for use with the media graph shown in FIG. 12 and the controls shown in FIG. 13.
Figure 15:
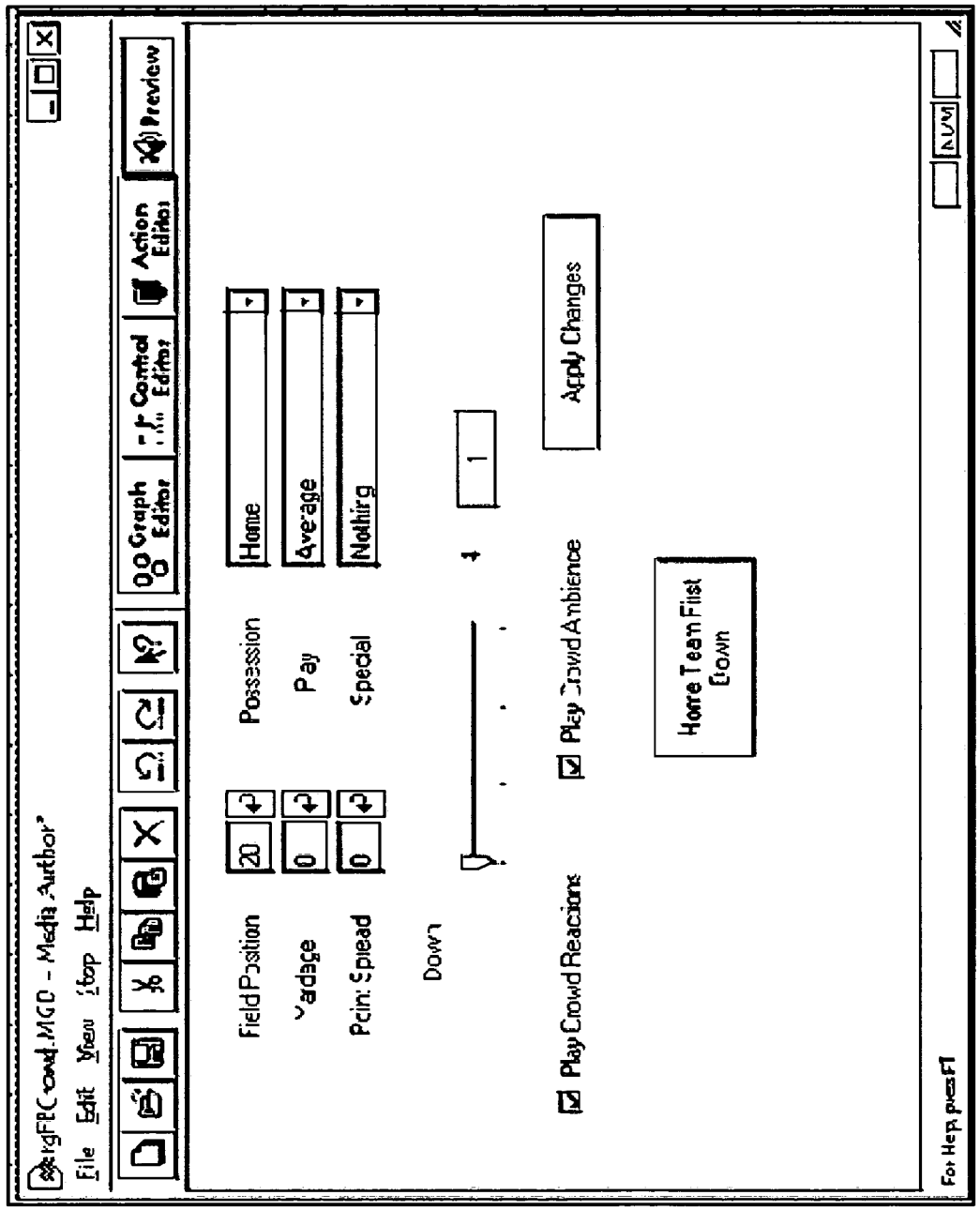
FIG. 15 is an example user interface of a preview display of the football game soundscape using the media graph shown in FIG. 12, the controls shown in FIG. 13, and the actions shown in FIG. 14.

FIGS. 12–15 illustrate another example of creating a soundscape. These figures illustrate a more complex soundscape than the one shown in FIGS. 7–10. This example illustrates a soundscape for a football game. FIG. 12 shows a media graph for a football game soundscape. FIG. 13 shows a control panel for testing the soundscape for a football game. FIG. 14 illustrates an action editor used to define actions for a football game soundscape. FIG. 15 illustrates a preview display for testing the football game soundscape defined using the media graph shown in FIG. 12, the controls defined in the control panel shown in FIG. 13, and the actions defined by the action editor shown in FIG. 14. A football game is just one example of the limitless list of media applications that can be created using the present invention. Other examples include: a flight simulator, interactive learning tools, etc.

While the preferred embodiment of the invention has been illustrated and described, it will be appreciated that various changes can be made therein without departing from the spirit and scope of the invention as defined by the appended claims.

APPENDIX A

```
<HTML>
<HEAD>
    <TITLE>User Interface Sound Effects DSDS MediaGraph Object 2.2</TITLE>
</HEAD>
<BODY BGCOLOR=#000000 TEXT=#00FF00 LANGUAGE="VBScript"
OnLoad="DoOnLoad">
<object CLASSID="clsid:1E9CB887-EAAF-11D1-A3BF-0060B0C2587C"
width="0%" height="0%" id=MediaGraph>
<PARAM name="Connections(1)" value="1:21–2:2">
<PARAM name="Events(1)"
value="0,T,,S:LeftCheckBox,A,,EvaluateCheckBoxes=0,A,,UISoundPool.Play(1'2C3'2
C1'2C-1)">
<PARAM name="Events(2)"
value="0,T,,S:MiddleCheckBox,A,,EvaluateCheckBoxes=0,A,,UISoundPool.Play(1'2C
3'2C1'2C0)">
<PARAM name="Events(3)"
value="0,T,,S:RightCheckBox,A,,EvaluateCheckBoxes=0,A,,UISoundPool.Play(1'2C3'
2C1'2C1)">
<PARAM name="Events(4)"
value="0,T,,S:LoadMediaInput,CB,,LoadMediaInput=1,A,,UISoundPool.LoadMedia(1'
2C1'2C1),CE,CB,,LoadMediaInput=2,A,,UISoundPool.LoadMedia(1'2C2'2C2),CE,CB,,
LoadMediaInput=3,A,,UISoundPool.LoadMedia(1'2C3'2C3),CE,CB,,LoadMediaInput=4,
A,,UISoundPool.LoadMedia(1'2C4'2C4),CE,CB,,LoadMediaInput=5,A,,UISoundPool.
LoadMedia(1'2C5'2C5),CE">
<PARAM name="Events(5)"
value="0,T,,S:ActionList,CB,,ActionList='22MouseOver'22,A,,UISoundPool.Play(1'2
C1'2C1'2C0),CE,CB,,ActionList='22ActionButton'22,A,,UISoundPool.Play(1'2C2'2C
1'2C0),CE,CB,,ActionList='22LeftCheckBox'22,A,,UISoundPool.Play(1'2C3'2C1'2C-
1),CB,,LeftCheckBox=0,A,,LeftCheckBox=1,A,,EvaluateCheckBoxes=1,CE,CB,,LeftCheck
Box=1,A,,LeftCheckBox=0,CE,CE,CB,,ActionList='22MiddleCheckBox'22,A,,UI
SoundPool.Play(1'2C3'2C1'2C0),CB,,MiddleCheckBox=0,A,,MiddleCheckBox=1,A,,Evaluate
CheckBoxes=1,CE,CB,,MiddleCheckBox=1,A,,MiddleCheckBox=0,CE,CE,CB,,
ActionList='22RightCheckBox'22,A,,UISoundPool.Play(1'2C3'2C1'2C1),CB,,RightCheck
Box=0,A,,RightCheckBox=1,A,,EvaluateCheckBoxes=1,CE,CB,,RightCheckBox=1,
A,,RightCheckBox=0,CE,CE,CB,,ActionList='22ComboBox'22,A,,UISoundPool.Play(
1'2C5'2C1'2C0),CE">
<PARAM name="Events(6)"
value="0,T,,S:EvaluateCheckBoxes,CB,,LeftCheckBox=1,CB,,MiddleCheckBox=1,CB,,
RightCheckBox=1,A,,EvaluateCheckBoxes=0,A,,UISoundPool.Play(1'2C4'2C1'2C0),
CE,CE,CE">
<PARAM name="Inputs(1)" value="0,LoadMediaInput,,3,1">
<PARAM name="Inputs(2)" value="0,ActionList,,8,'22MouseOver'22">
<PARAM name="Inputs(3)" value="0,LeftCheckBox,,11,0">
<PARAM name="Inputs(4)" value="0,MiddleCheckBox,,11,0">
<PARAM name="Inputs(5)" value="0,RightCheckBox,,11,0">
<PARAM name="Inputs(6)" value="0,EvaluateCheckBoxes,,8,'22'22">
<PARAM name="Inputs(7)" value="0,notusedatruntime,,8,'22When all checkboxes are
checked a flourish will sound'22">
<PARAM name="Nodes(1)" value="StaticChannelPool,Name:UISoundPool">
<PARAM name="Nodes(2)"
value="URLCollection,Name:UISoundCollection,URLs(1):\\Imt\public\DSDS22_Demos\
RefBU\Sounds\m_over.wav,URLs(2):\\Imt\public\DSDS22_Demos\RefBU\Sounds\m_down.
wav,URLs(3):\\Imt\public\DSDS22_Demos\RefBU\Sounds\snap01.wav,URLs(4):
\\Imt\public\DSDS22_Demos\RefBU\Sounds\servoL2R.wav,URLs(5):\\Imt\public\DS
DS22_Demos\RefBU\Sounds\flydownC2RQ.wav">
(The MediaGraph Object has failed to load.)
</object>
<SCRIPT LANGUAGE="VBScript">
Sub DoOnLoad
    InitializeSounds
End Sub
Sub InitializeSounds
on error resume next
if( Err ) then
    msgbox "MediaGraph is not installed."
    Window.location.href = "../Install/Default.htm"
    Err.Clear
end if
    'Load the WAV Sources...
    MediaGraph.InputValues("LoadMediaInput") = 1
    MediaGraph.InputValues("LoadMediaInput") = 2
    MediaGraph.InputValues("LoadMediaInput") = 3
    MediaGraph.InputValues("LoadMediaInput") = 4
    MediaGraph.InputValues("LoadMediaInput") = 5
End Sub
Sub btnAction_OnClick
    MediaGraph.InputValues("ActionList") = "ActionButton"
End sub
Sub ref1_OnMouseOver
```

APPENDIX A-continued

```
    MediaGraph.InputValues("ActionList") = "MouseOver"
End Sub
Sub SelectBox_OnChange
    MediaGraph.InputValues("ActionList") = "ComboBox"
End Sub
Sub DoCheckBox1
    MediaGraph.InputValues("ActionList") = "RightCheckBox"
End Sub
Sub DoCheckBox2
    MediaGraph.InputValues("ActionList") = "MiddleCheckBox"
End Sub
Sub DoCheckBox3
    MediaGraph.InputValues("ActionList") = "LeftCheckBox"
End Sub
</SCRIPT>
<CENTER>
<H1>DirectSound Design Studio 2.2</H1>
<H2>Simple UI Sound Effects Using the MediaGraph Object</H2>
</CENTER>
<br>
<br>
<CENTER>
<FORM NAME="MainForm">
    <A NAME=ref1>Pass Mouse Over me!</A><P>
    Click Me! <INPUT TYPE=BUTTON NAME=btnAction VALUE="Action Button"><P>
    <INPUT TYPE=CHECKBOX NAME=cbCheck1 OnClick="DoCheckBox3">Check Left Speaker!
    <INPUT TYPE=CHECKBOX NAME=cbCheck2 OnClick="DoCheckBox2">Check Both Speakers!
    <INPUT TYPE=CHECKBOX NAME=cbCheck3 OnClick="DoCheckBox1">Check Right Speaker!<p>
    Select one of my items:
    <SELECT NAME="SelectBox" SIZE="1">
        <OPTION VALUE="0">One
        <OPTION VALUE="1">Two
        <OPTION VALUE="2">Three
        <OPTION VALUE="3">Four
    </SELECT><p>
</FORM>
</CENTER>
<HR>
UI Sounds:
<UL>
    <LI> Mousing Over Text (IE 4 only)
    <LI> Clicking a button
    <LI> Selecting an Item from a drop down list
    <LI> Clicking CheckBoxes
    <LI> Special SoundFX when all CheckBoxes are checked
</UL>
</BODY>
</HTML>
```

The invention claimed is:

1. A tool for generating and testing a soundscape for use in a media application comprising a user interface component that allows an audio designer to generate and test a soundscape using the user interface component independently of the media application by building a media graph including a plurality of nodes connected together, the nodes including nodes chosen from a group of nodes including sound source, sound sink, sound filter, and controller nodes.

2. The tool of claim 1, further comprising a run-time component, that plays the audio defined by the soundscape.

3. The tool of claim 2, wherein the run-time component plays the audio according to a plurality of API calls in the media application.

4. The tool of claim 1, wherein the nodes are connected together in accordance with user input.

5. The tool of claim 4, wherein the sound source nodes include MIDI, Phrase Construction, Record, StreamWav, and URLWave nodes.

6. The tool of claim 4, wherein the sound sink nodes include Channel, ChannelPool, CrossFade, StaticChannelPool, and WavWrite nodes.

7. The tool of claim 4, wherein the sound filter nodes include Append, Clip, Envelope, Loop, Mix, Resample, Speed, and Splitter nodes.

8. The tool of claim 4, wherein the controller nodes include a URLCollection node.

9. A tool for generating a soundscape for use in a media application comprising a user interface component that allows an audio designer to build a media graph including nodes connected together, the nodes including nodes chosen from a group including sound source, sound sink, sound filter, and controller nodes.

10. The tool of claim 9, wherein the sound source nodes include MIDI, Phrase Construction, Record, StreamWav, and URLWave nodes.

11. The tool of claim 9, wherein the sound sink nodes include Channel, ChannelPool, CrossFade, StaticChannelPool, and WavWrite nodes.

12. The tool of claim 9, wherein the sound filter nodes include Append, Clip, Envelope, Loop, Mix, Resample, Speed, and Splitter nodes.

13. The tool of claim 9, wherein the controller nodes include a URLCollection node.

14. The tool of claim 9, wherein the nodes are connected together in accordance with user input.

15. The tool of claim 14, wherein the sound source nodes include MIDI, Phrase Construction, Record, StreamWav, and URLWave nodes.

16. The tool of claim 14, wherein the sound sink nodes include Channel, ChannelPool, CrossFade, StaticChannelPool, and WavWrite nodes.

17. The tool of claim 14, wherein the sound filter nodes include Append, Clip, Envelope, Loop, Mix, Resample, Speed, and Splitter nodes.

18. The tool of claim 14, wherein the controller nodes include a URLCollection node.

* * * * *

UNITED STATES PATENT AND TRADEMARK OFFICE
CERTIFICATE OF CORRECTION

PATENT NO. : 7,039,478 B2
APPLICATION NO. : 10/870242
DATED : May 2, 2006
INVENTOR(S) : Ledoux et al.

It is certified that error appears in the above-identified patent and that said Letters Patent is hereby corrected as shown below:

In column 7, line 44, delete "specificatios" and insert -- specifications --, therefor.

Signed and Sealed this

Twentieth Day of April, 2010

David J. Kappos
*Director of the United States Patent and Trademark Office*